US012762027B2

(12) United States Patent
Sethi et al.

(10) Patent No.: US 12,762,027 B2
(45) Date of Patent: Oct. 13, 2026

(54) DISASTER RECOVERY SYSTEM FOR EDGE DEPLOYMENTS

(71) Applicant: Dell Products L.P., Round Rock, TX (US)

(72) Inventors: Parminder Singh Sethi, Ludhiana (IN); Anay Kishore, Bangalore (IN); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/005,396

(22) Filed: Dec. 30, 2024

(65) Prior Publication Data

US 2026/0186923 A1 Jul. 2, 2026

(51) Int. Cl.
*G06F 11/20* (2006.01)
*G06F 11/1446* (2026.01)

(52) U.S. Cl.
CPC ...... *G06F 11/2023* (2013.01); *G06F 11/1464* (2013.01); *G06F 11/1469* (2013.01)

(58) Field of Classification Search
CPC ............. G06F 11/2023; G06F 11/1464; G06F 11/1469
See application file for complete search history.

(56) References Cited

U.S. PATENT DOCUMENTS

2006/0015773 A1* 1/2006 Singh .................. G06F 11/2046 714/13
2007/0094659 A1* 4/2007 Singh .................. G06F 9/45533 718/1
2014/0337663 A1* 11/2014 Gokhale ............... G06F 3/0619 714/6.3
2015/0301910 A1* 10/2015 Sathyanarayana .......................... G06F 11/2041 714/4.11
2016/0034548 A1* 2/2016 Khosrowpour ......... G06F 9/452 707/639
2024/0364582 A1* 10/2024 Perks .................. H04L 41/0846

* cited by examiner

*Primary Examiner* — Bryce P Bonzo
*Assistant Examiner* — Audrey Emma Whitesell
(74) *Attorney, Agent, or Firm* — Fogarty LLP

(57) ABSTRACT

A disaster recovery system includes a first IHS (Information Handling System) at an edge location. A monitoring client operating on the first IHS collects snapshots of an application operating on the first IHS and transmits the snapshots to a recovery client operating at a remote location. The first IHS also transmits periodic signals to the recovery client. The disaster recovery system also includes a second IHS at a datacenter location. A recovery client operating on the second IHS receives and stores the snapshots of the application operating on the first IHS and initiates failover operations of the first application using the stored snapshots upon failure to receive the periodic signals from the monitoring client.

17 Claims, 4 Drawing Sheets

DISASTER RECOVERY SYSTEM FOR EDGE DEPLOYMENTS

FIELD

The present disclosure relates generally to Information Handling Systems (IHSs), and relates more particularly to disaster recovery for IHSs that are deployed at edge locations.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be deployed in a wide variety of locations and utilized in a wide variety of computational tasks. In some instances, IHSs may be servers configured to support edge computing at the physical edge of a network. Edge server IHSs may support connections between networks and/or may provide users with high-availability computing and entry points to a network. Located at edge locations, edge server IHSs store at least some information in physical proximity to users, thus minimizing latency and providing efficient computational capabilities without relying strictly on remote computing, such as provided in cloud networks.

Backup systems for IHSs provide capabilities for recovery of data in the event of user error, software error, system outage, hardware failure, or some catastrophic event. In addition to recovery of data, enterprise disaster recovery systems may support failover operations, whereby computing operations previously running at locations effected by the disaster are resumed at other locations.

SUMMARY

In various embodiments, a disaster recovery system may include: a first IHS (Information Handling System) at an edge location. The first IHS may include: one or more processors; one or more memory devices coupled to the processors, the memory devices storing computer-readable instructions that, upon execution by the processors, cause a first monitoring client to: collect snapshots of an application operating on the first IHS; transmit the snapshots to a recovery client operating at a remote location; and transmit periodic signals to the recovery client. The disaster recovery system may further include a second IHS at a datacenter location, the second IHS comprising: one or more processors; one or more memory devices coupled to the processors, the memory devices storing computer-readable instructions that, upon execution by the processors, cause the recovery client to: receive and store the snapshots of the application operating on the first IHS; and initiate failover operations of the first application using the stored snapshots upon failure to receive the periodic signals from the monitoring client.

In some embodiments, the first monitoring client is further caused to: detect a failure on the first IHS and to notify the recovery client of the failure on the first IHS. In some embodiments, the notification comprises a signal for the recovery client to initiate failover operations for the application operating on the first IHS. In some embodiments, the recovery client is further caused to: identify all monitoring clients operating at the edge location upon failure to receive the periodic signals from the first monitoring client. In some embodiments, the recovery client is further caused to direct all identified monitoring clients operating at the edge location to capture available snapshots and to transmit the captured snapshots. In some embodiments, the first IHS further comprises a remote access controller operating a secure execution environment that hosts a second monitoring client that is configured to collect snapshots of the first IHS and to transmit the snapshots to the recovery client. In some embodiments, the second monitoring client operating on the remote access controller collects a sideband snapshot of the first IHS and wherein the first monitoring client collects an inband snapshot of the application operating on the first IHS. In some embodiments, the first monitoring client is operated by a hypervisor operating on the first IHS and wherein the first application comprises a virtual environment. In some embodiments, the recovery client initiates failover operations for the virtual environment at the datacenter using snapshots of the virtual environment provided by the monitoring client and stored by the recovery client. In some embodiments, the first monitoring client is operated by an operating system of the first IHS and wherein the first application comprises an operating system application of the first IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
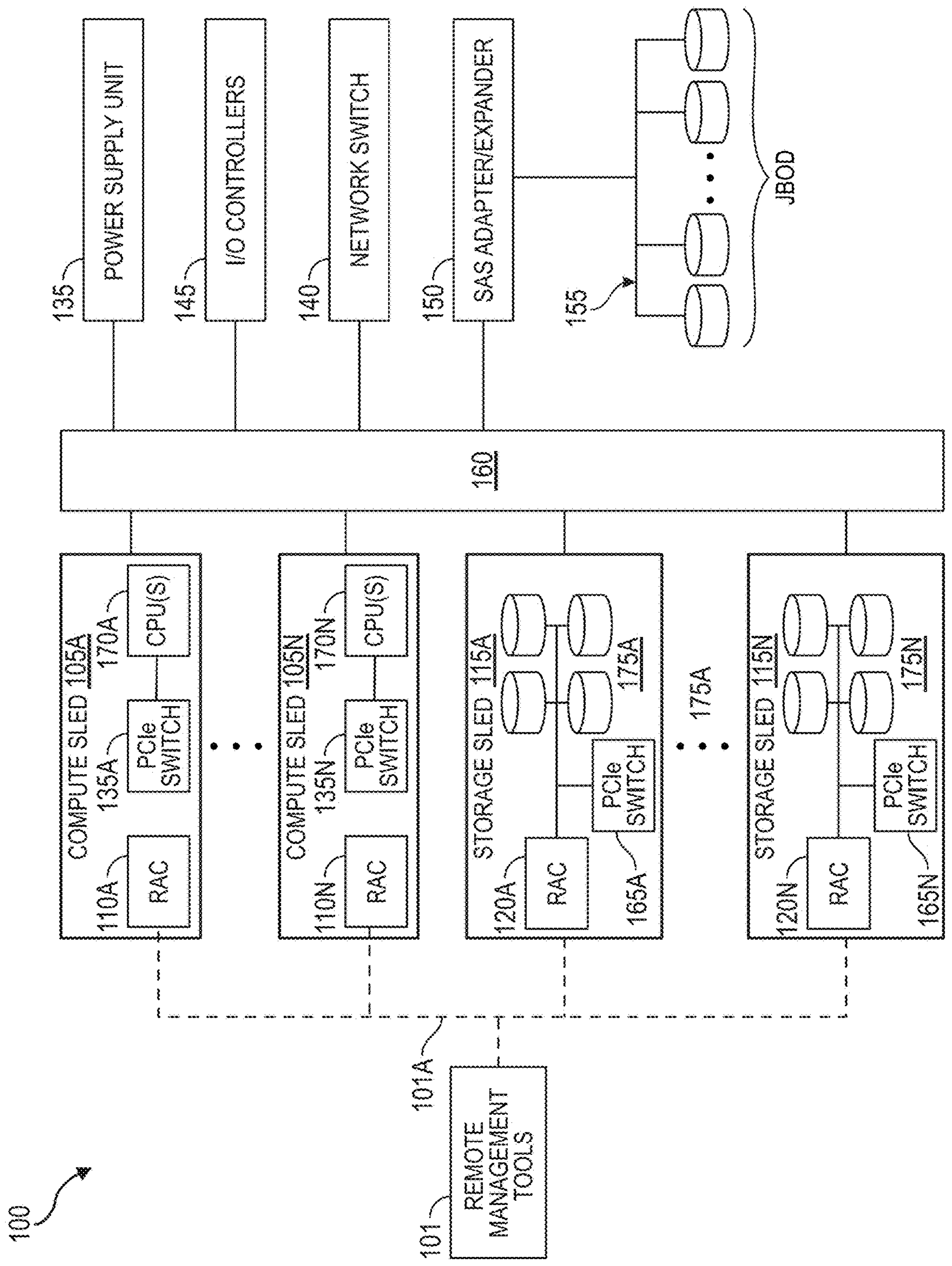
FIG. 1 is a diagram illustrating certain components of a chassis configured, according to some embodiments, to support disaster recovery at edge locations.

FIG. 1 is a block diagram illustrating certain components of a chassis 100 comprising one or more compute sleds 105*a-n* and one or more storage sleds 115*a-n* that may be collectively and/or individually configured to implement the systems and methods described herein for disaster recovery at edge locations. In some scenarios, chassis 100 may be deployed at datacenter locations that house large numbers or racks, each including multiple chassis 100. In some scenarios, chassis 100 may instead be deployed at an edge location, whereby chassis 100 may still be installed in a rack along with other chassis 100, but such edge deployments are considerably smaller and provide on-premises computing for a specific enterprise or organization. Embodiments provide disaster recovery for computing systems that span datacenter and edge locations, and may utilize embodiments of chassis 100 that may be adapted for disaster recovery of such computing systems while operating at either datacenter or edge locations.

In some embodiments, the chassis 100 may host one or more Monitoring Edge Clients (MECs) that collects snapshots of computing operations being conducted by the IHSs 200 installed in the chassis. MECs may be deployed in chassis 100 that are installed edge locations, and may also be installed in chassis 100 that are at datacenter locations. In addition, embodiments of chassis 100 may also host one or more Recovery Edge Clients (RECs), typically when chassis 100 is deployed in datacenter. The RECs may store snapshots and other backup data that is collected by MECs, where the RECs provide a repository from which disaster recovery operations may be initiated. Embodiments may also utilize one or more chassis 100 installed at datacenter locations that provide back-end processing and/or bulk storage of snapshots and other backup data.

Embodiments of chassis 100 may include a wide variety of different hardware configurations. Such variations in hardware configuration may result from chassis 100 being factory configured to include components specified by a customer that has contracted for manufacture, provisioning and delivery of the chassis 100. Configured in this manner, a chassis 100 may be tasked as a single entity that combines the capabilities of the sleds 105*a-n*, sleds 115*a-n* and/or other hardware that is included in the chassis 100, such as network switches 140 and power supplies 135.

All of the hardware components of the chassis 100 may be installed within a rack 100 may include one or more slots that each receive an individual sled (that may be additionally or alternatively referred to as a server, node and/or blade), such as compute sleds 105*a-n* and storage sleds 115*a-n*. A rack may support a variety of different numbers, sizes (e.g., 1RU, 2RU) and physical configurations of slots. Chassis 100 embodiments may support additional types of sleds that may be installed within a rack and provide various types of storage and/or processing capabilities. Sleds may be individually installed and removed from a rack, thus allowing the computing and storage capabilities of a rack, and thus of a chassis 100, to be reconfigured, in many cases without affecting the operation of the other hardware installed in the rack.

The modular architecture provided by the chassis 100 allows for certain resources, such as cooling, power and network bandwidth, to be shared by the compute sleds 105*a-n* and storage sleds 115*a-n* or other hardware installed in the rack, thus providing efficiency improvements and supporting greater computational loads. The rack may provide all or part of the cooling utilized by sleds 105*a-n*, 115*a-n* of a chassis 100. For airflow cooling, a chassis 100 may include one or more banks of cooling fans that may be operated to ventilate heated air away from the hardware that is installed within the chassis. In some embodiments, chassis 100 may include liquid cooling manifolds that can be connected to IHSs or other hardware in providing these components with liquid cooling capabilities.

Figure 2:
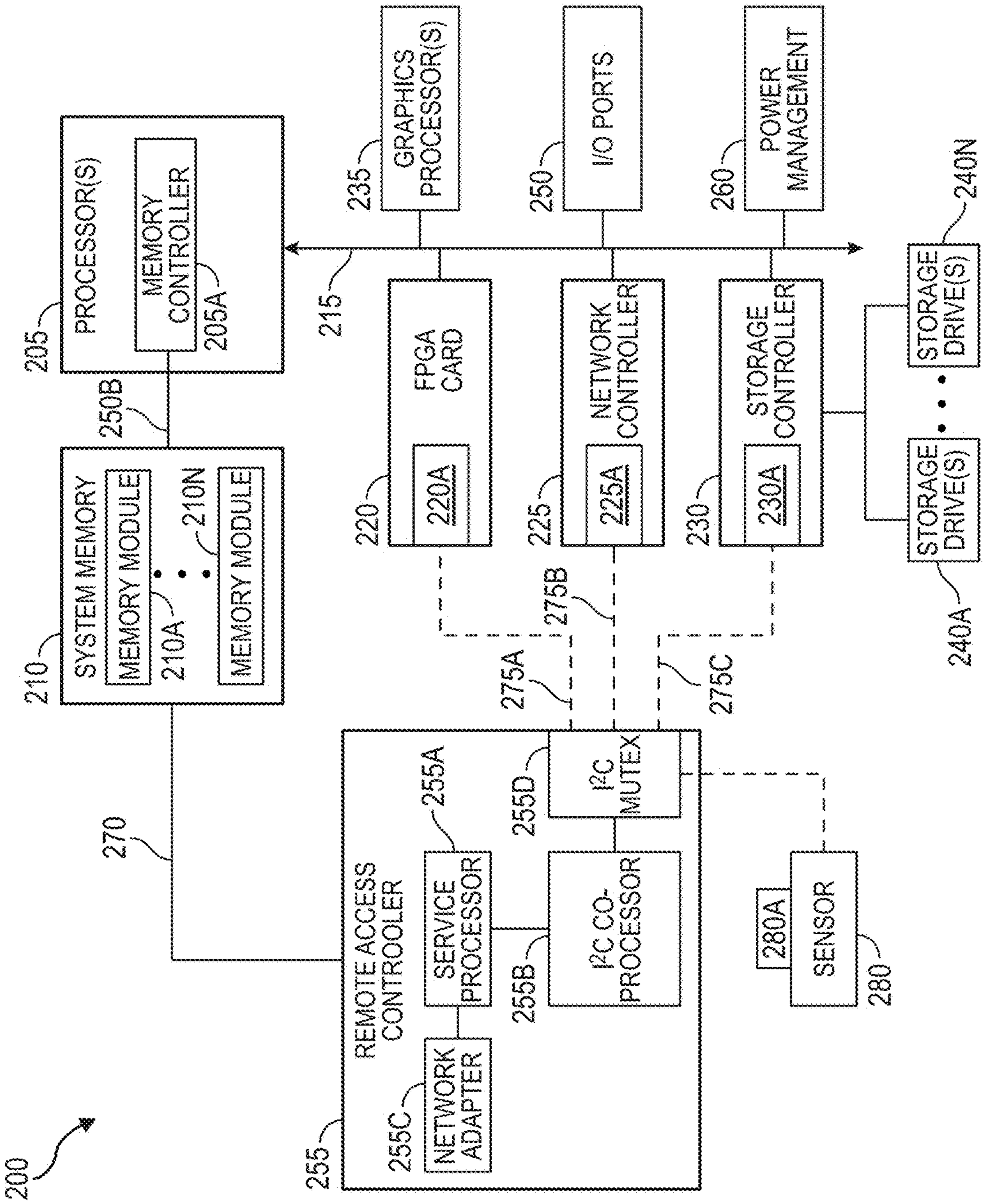
FIG. 2 is a diagram illustrating certain components of an IHS configured, according to some embodiments, to support disaster recovery at edge locations.

In certain embodiments, a compute sled 105*a-n* may be an IHS such as described with regard to IHS 200 of FIG. 2. A compute sled 105*a-n* may provide computational processing resources that may be used to support a variety of e-commerce, multimedia, business and scientific computing applications. Compute sleds 105*a-n* are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks.

As described with regard to FIG. 2, a compute sled IHS 105*a-n* may include a variety of different hardware components that may be each be individually monitored for disaster recovery purposes. In some embodiments, each compute sled IHS 105*a-n* may include capabilities for hosting one or more MECs that collect snapshots and other backup data, and that also detect failures or other conditions that warrant coordinating with one or more RECs installed in other chassis, either in the same edge location or at the datacenter, for initiating preparations for failover procedures.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications by compute sled 105*a-n*. Remote access controllers 110*a-n* may collect various types of sensor data, such as collecting temperature sensor readings that are used in support of airflow cooling of the sleds 105*a-n*, 115*a-n*. In addition, each remote access controller 110*a-n* may implement various monitoring and administrative functions related to compute sleds 105*a-n* that utilize sideband bus connections with various internal components of the respective compute sleds 105*a-n*.

In some embodiments, such sideband data collection capabilities of remote access controllers 110*a-n* may be used to collect snapshots, state information or other backup data for use in disaster recovery with respect to computing operations being conducted in full or in part by a respective compute sleds 105*a-n* installed in chassis. In some embodiments, such sideband data collection capabilities of remote access controllers 110*a-n* may be further utilized to detect failures or other conditions that warrant the initiation of failover procedures. As described in additional detail below, in some embodiments, each respective remote access controllers 110*a-n* may be configured to implement an REC or a MEC depending on the installed location of a respective chassis 100 (e.g., edge location or datacenter), and may be further configured to interface with neighboring remote access controllers to minimize overlaps in monitoring and snapshot collection.

Implementing computing clusters that span multiple processing components (e.g., 105*a-n*, 115*a-n*) of one or more chassis 100 may be aided by high-speed data links between these processing components, such as PCIe connections that form one or more distinct PCIe switch fabrics 160 that may implemented by network switches 140 and PCIe switches 135*a-n*, 165*a-n* installed in the IHSs 105*a-n*. These high-speed data links may be used to support software that operates spanning multiple processing, networking and storage components of a chassis 100.

As illustrated, chassis 100 may also include one or more storage sleds 115*a-n* that may be installed within one or more slots of a rack, in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. As illustrated, each storage sled 115*a-n* includes a remote access controller (RAC) 120*a-n* provides capabilities for remote monitoring and management of respective storage sleds 115*a-n*. In some embodiments, each of the storage sleds 115*a-n* may include a PCIe switch 165*a-n* for use in coupling the sleds to a switch fabric 160, by which the storage sleds may interface with other computing components of chassis 100.

In the same manner as compute sleds IHS 105*a-n*, each storage sled 115*a-n* may include a remote access controllers 120*a-n* that may be used to collect snapshots, state information or other backup data for use in disaster recovery with respect to data storage operations being conducted in full or in part by a respective storage sleds 115*a-n* installed in chassis. In some embodiments, sideband data collection capabilities of remote access controllers 120*a-n* may be utilized to detect failures or other conditions with respect to a respective storage sled that warrant the initiation of failover procedures. As described in additional detail below, in some embodiments, each respective remote access controller 120*a-n* may be configured to implement an REC or a MEC depending on the installed location of a respective chassis 100, and may be further configured to interface with neighboring remote access controllers to minimize overlaps in monitoring and snapshot collection.

The remote access controllers 110*a-n*, 120*a-n* that are present in a chassis 100 may support secure connections with remote management tools 101. In some embodiments, remote management tools 101 provides a remote administrator, whether manual or automated, with various capabilities for remotely administering the operation of an individual IHS or of the chassis 100, including initiating updates to the software and hardware operating in the cluster. The remote management tools 101 may also include various monitoring interfaces for evaluating telemetry data collected by the remote access controllers 110*a-n*, 120*a-n*. In some embodiments, remote management tools 101 may communicate with remote access controllers 110*a-n*, 120*a-n* via a protocol such the Redfish remote management interface.

As illustrated, the chassis 100 of FIG. 1 includes a network switch 140 that may provide network access to the sleds 105*a-n*, 115*a-n* of the chassis. Network switch 140 may include various switches, adapters, controllers and couplings used to connect chassis 100 to a network and/or to local IHSs, such as another chassis. Whereas the illustrated embodiment of FIG. 1 includes a single network switch in a chassis 100, different embodiments may operate using different numbers of network switches.

In some embodiments, chassis 100 may include one or more power supply units 135 that provides the components of the chassis with various levels of DC power from an AC power source or from power delivered via a power system that may be provided by a rack within which the chassis is installed. In certain embodiments, power supply unit 135 may be implemented within a sled that may provide the chassis 100 with multiple redundant, hot-swappable power supply units.

In addition to the data storage capabilities provided by storage sleds 115*a-n*, chassis 100 include other storage resources that may be installed within a rack housing the chassis 100, such as within a storage blade. In certain scenarios, such storage resources 155 may be accessed via a SAS expander 150 that is coupled to the switch fabric 160 of the chassis 100. The SAS expander 150 may support connections to a number of JBOD (Just a Bunch Of Disks) storage drives 155 that may be configured and managed individually and without implementing data redundancy across the various drives 155. In some embodiments, the data storage resources 155 of a JBOD accessed by the chassis 100 may be utilized in a virtualized manner by cloud systems, such as software defined storage systems.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein to support disaster recovery at edge locations. As described above, two possible deployment locations of an IHS 200 include datacenter deployments and edge location deployments. Accordingly, IHS 200 may be adapted for disaster recovery operations in either scenario, such as through hosting one or more MECs when deployed at edge locations and hosting an REC when deployed at a datacenter location. IHS 200 may be further adapted to interoperate with nearby IHSs in the collection of snapshots and other backup data, as well as in detecting failures and in initiating recovery operations.

It should be appreciated that although embodiments may describe an IHS that is a compute sled or similar computing component that may be deployed within slots of a rack, other embodiments may be utilized with other types of IHSs that may also be members of a chassis 100 according to embodiments. In the illustrative embodiment of FIG. 2, IHS 200 may be a computing component, such as compute sled 105*a-n* or other type of server, such as an 1RU server installed within a 2RU chassis, that is configured to share infrastructure resources provided by a rack.

As described, an IHS 200 may be assembled and provisioned according to customized specifications provided by a customer. The IHS 200 of FIG. 2 may be a compute sled, such as compute sleds 105*a-n* of FIG. 1, that may be installed within a rack in a data center. Installed in this manner, IHS 200 may utilize shared power, network and cooling resources provided by the rack. Embodiments of IHS 200 may include a wide variety of different hardware configurations. Such variations in hardware configuration may result from IHS 200 being factory assembled to include components specified by a customer that has contracted for manufacture and delivery of IHS 200.

IHS 200 may include capabilities that allow a customer to validate that the hardware components of IHS 200 are the same hardware components that were installed at the factory during its manufacture, where these validations of the IHS hardware may be initially completed using a factory-provisioned inventory certificate. An IHS 200 may include capabilities that allow, during initialization of the IHS, validation of the detected hardware of the IHS as being the same factory installed and provisioned hardware that was factory provisioned. Some embodiments may support disaster recovery of IHS 200 such that snapshots are generated for all MECs of an IHS 200 upon detecting any failure to confirm the authenticity of the detected hardware of an IHS using a factory provisioned inventory certificate of the IHS.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205*a* that may be implemented directly within the circuitry of the processor 205, or the memory controller 205*a* may be a separate integrated circuit that is located on the same die as the processor 205. The memory controller 205*a* may be configured to manage the transfer of data to and from the system memory 210 of the IHS 205 via a high-speed memory interface 205*b*. The system memory 210 is coupled to processor(s) 205 via a memory bus 205*b* that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor (s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220*a* that may support interoperation with the remote access controller 255 via a sideband device management bus 275*a*.

Processor(s) 205 may also be coupled to one or more network controllers 225 via in-band bus 215, such as provided by a Network Interface Controller (NIC) that allows the IHS 200 to communicate via an external network, such as the Internet or a LAN. In some embodiments, network controllers 225 may include a replaceable expansion card or adapter that is coupled to a motherboard connector of IHS 200. In some embodiments, a network controller 225 may be a PCIe switch, such as PCIe switches 165*a-n* described in computing cluster 100, while in other embodiments, the network controllers 255 of IHS 200 may include both a PCIe switch and a separate ethernet network controller. As described, a PCIe switch may be used by the IHS 200 to interface with other members of a computing cluster via a switch fabric 160.

IHS 200 may include one or more storage controllers 230 that may be utilized to access storage drives 240*a-n* that are accessible via a rack in which IHS 100 is installed. Storage controller 230 may provide support for RAID (Redundant Array of Independent Disks) configurations of logical and physical storage drives 240*a-n*. In some embodiments, storage controller 230 may be an HBA (Host Bus Adapter) that provide more limited capabilities in accessing physical storage drives 240*a-n*. In some embodiments, storage drives 240*a-n* may be replaceable, hot-swappable storage devices that are installed within bays provided by the chassis in which IHS 200 is installed. In embodiments where storage drives 240*a-n* are hot-swappable devices that are received by bays of chassis, the storage drives 240*a-n* may be coupled to IHS 200 via couplings between the bays of the chassis and a midplane of IHS 200. In some embodiments storage drives 240*a-n* may also be accessed by other IHSs that are also installed within the same chassis as IHS 100. Storage drives 240*a-n* may include SAS (Serial Attached SCSI) magnetic disk drives, SATA (Serial Advanced Technology Attachment) magnetic disk drives, solid-state drives (SSDs) and other types of storage drives in various combinations.

A variety of additional components may be coupled to processor(s) 205 via in-band bus 215. For instance, processor(s) 205 may also be coupled to a power management unit 260 that may interface with the power system unit 135 of the computing cluster 100 in which an IHS may be a member. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. In the evaluation of detected IHS hardware versus hardware identified in a factory-provisioned inventory certificate, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state).

During a provisioning phase of the factory assembly of IHS 200, a signed inventory certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200.

In some embodiments, IHS 200 may be configured for operation in a disaster recovery system through the operation of a MEC or REC by the remote access controller 255 of the IHS, such as operating in a secure execution environment of the remote access controller. In some embodiments, remote access controller 255 may be configured to implement a MEC or a REC based on determinations by the remote access controller regarding the need for one or both of these disaster recovery clients. In some embodiments, remote access controller 255 may interface with remote access controllers in nearby IHSs in order to ascertain wither a MEC and/or REC should be implemented to support recovery procedures for the IHS 200. In some embodiments, a remote access controller 255 may determine the need for one or more MECs operating on the IHS 200 based on remote access controller failing to detect any other remote access controllers in the immediate vicinity, such as through wireless signaling 255*c*, thus indicating the IHS is at an edge location and not at a datacenter.

In some embodiments, sideband management interfaces 275*a-c* of the remote access controller 255 may be used in collecting snapshot information and/or for the detection of failures or other conditions that warrant initiating disaster recovery procedures supported by the MEC and/or REC hosted by the remote access controller. In embodiments where a MEC is implemented by a remote access controller 255, the sideband interfaces 275*a-c* may be used in collecting state information for managed hardware of the IHS, such as collecting PCIe 215 lane configurations that may be used in reconfiguring another IHS in the exact same manner as IHS 200 in support of disaster recovery for a set of virtual machines operating on the IHS 200.

In support of the capabilities for validating the detected hardware components of IHS 200 against the inventory information that is specified in a signed inventory certificate, remote access controller 255 may include various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller

255. In some embodiments, the remote access controller 255 may utilize this factory installed inventory information from the inventory certificate to identify snapshot and/or state information as originating from a validated hardware component of the IHS, thus providing assurances to the failover site IHS that the snapshot and state information as originating from a trusted source.

In some embodiments, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-d* that may be individually established with each of the respective managed devices 220, 225, 230, 280 through the operation of an I2C multiplexer 255*d* of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275*a-d* used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255*a* of remote access controller 255 may rely on an I2C co-processor 255*b* to implement sideband I2C communications between the remote access controller 255 and managed components 220, 225, 230, 280 of the IHS. The I2C co-processor 255*b* may be a specialized co-processor or micro-controller that is configured to interface via a sideband I2C bus interface with the managed hardware components 220, 225, 230, 280 of IHS. In some embodiments, the I2C co-processor 255*b* may be an integrated component of the service processor 255*a*, such as a peripheral system-on-chip feature that may be provided by the service processor 255*a*. Each I2C bus 275*a-d* is illustrated as single line in FIG. 2. However, each I2C bus 275*a-d* may be comprised of a clock line and data line that couple the remote access controller 255 to I2C endpoints 220*a*, 225*a*, 230*a*, 280*a* which may be referred to as modular field replaceable units (FRUs).

As illustrated, the I2C co-processor 255*b* may interface with the individual managed devices 220, 225, 230, 280 via individual sideband I2C buses 275*a-d* selected through the operation of an I2C multiplexer 255*d*. Via switching operations by the 12C multiplexer 255*d*, a sideband bus connection 275*a-d* may be established by a direct coupling between the I2C co-processor 255*b* and an individual managed device 220, 225, 230, 280. In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
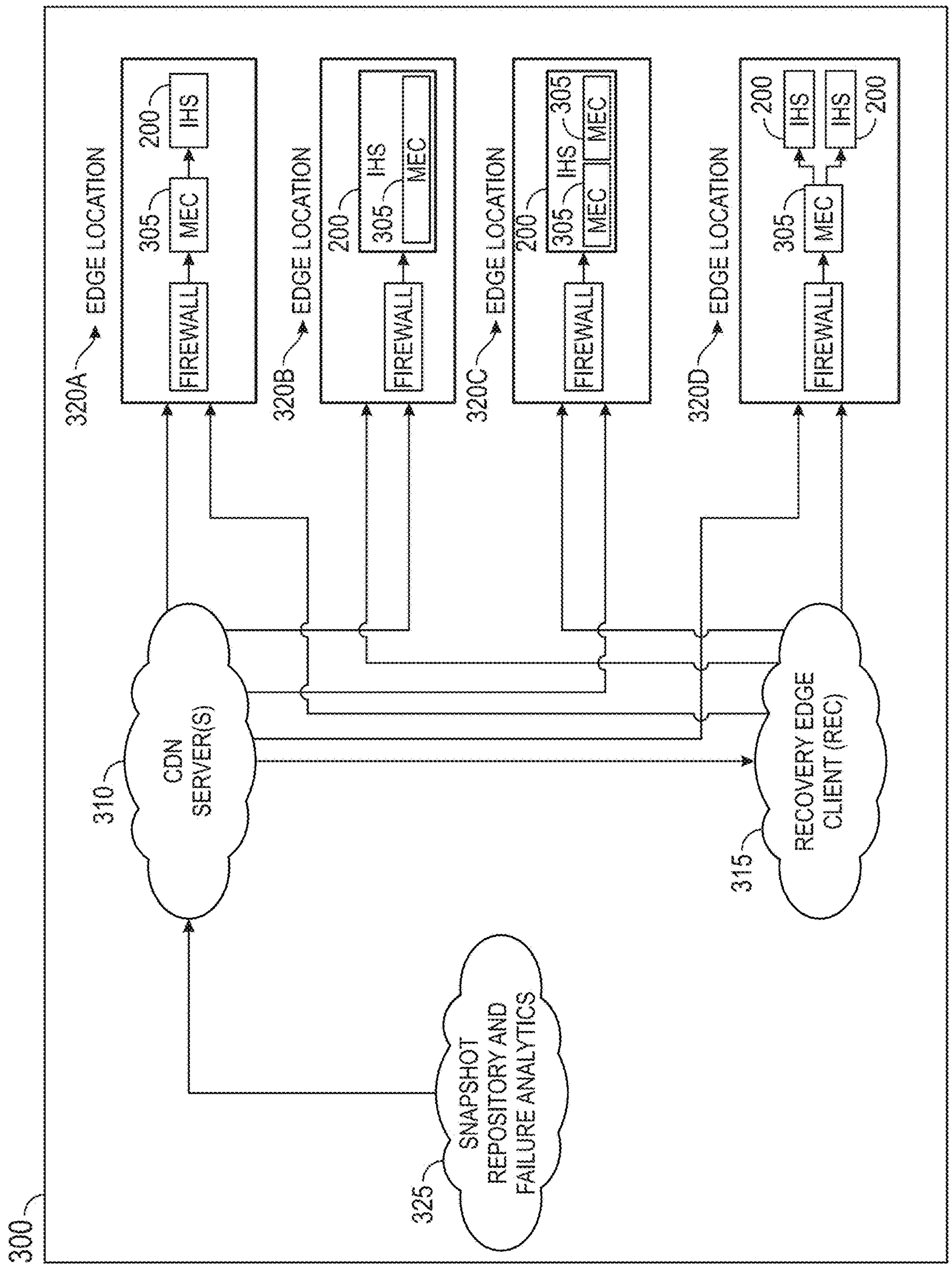
FIG. 3 is a diagram illustrating certain components of a system configured, according to some embodiments, to support disaster recovery at edge locations.
Figure 4:
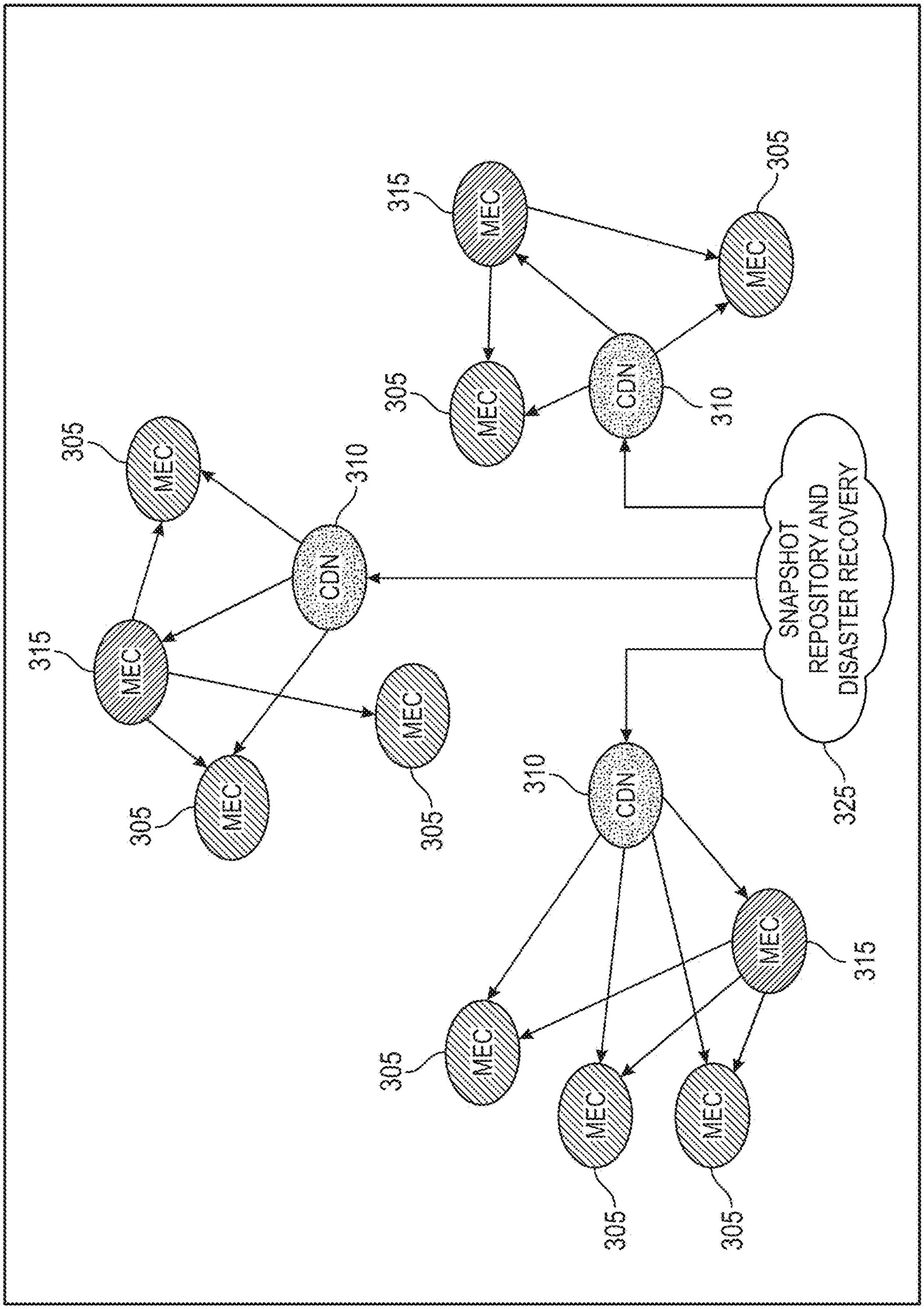
FIG. 4 is a diagram illustrating certain components of an additional system configured, according to some embodiments, to support disaster recovery at edge locations.

FIG. 3 is a diagram illustrating certain components of a system 300 configured, according to some embodiments, to support disaster recovery at edge locations. FIG. 4 is a diagram illustrating certain components of an additional system configured, according to some embodiments, to support disaster recovery at edge locations. As described above, multi-network facilities such as datacenters in support of one or more edge locations 320*a-d* include a complex, heterogeneous environment that includes an array of different types of hardware systems, such as server IHSs 200. Such environments present a difficult scenario for disaster recovery. Since the number of IHSs, services, applications may be extremely high in an edge computing system, embodiments provide disaster recovery that operates based on edge computing principles.

Embodiments may support disaster recovery through an edge computing client, referred to herein as a Monitoring Edge Client (MEC) 305, that may be deployed at edge locations 320*a-d* in monitoring IHSs 200, and services and applications operating on those IHSs. Each MEC 305 may be configured to capture alerts and events for use in diagnosing failures and may report such information to a back-end analytics system 325 for evaluation and failure prediction. Each MEC 305 may report to one or more Recovery Edge Client (REC) 315 for both backup and recovery purposes. In addition, embodiments may include organization level central repository system 325 to store and manage backups and snapshots.

In the illustrated embodiment, each of the MECs 305 are deployed at edge locations 320*a-d* and the REC is deployed at the datacenter that supports the edge locations. However, in some embodiments, both the MEC and REC may be deployed on premises at edge locations. The snapshots and other backups collected by the MEC 305 may be stored by one or more designated RECs 315 to support recovery procedures. Embodiments may also utilize one or more CDN servers 310 that are deployed in different regions and/or countries to support the REC 315 and MEC 305 clients. Embodiments may also utilize a backend system 325 that may be at a centrally located datacenter and may include one or more servers that collect data from MEC 305 and REC 315 clients for analytical study and to generate predictions related to failures and patterns related to failures and disasters. This backend system 325 may server as a repository for snapshot and other backup data in support of the RECs 315 deployed throughout the disaster recovery system 300.

The backend system 325 may include cloud-based repository that may provide segregated storage and disaster recovery capabilities for individual organizations, such as an organization utilizing computing at one or more edge locations 320*a-d*. In some embodiments, the backend system 325 may be deployed within cloud-based network and may store analytic data, snapshots and other backup information from geographically distributed datacenters. The backend system 325 may deployed in cloud environment that provides uninterrupted availability of backup and recovery data use by participating datacenters and edge locations. The backend system 325 may accepts uploads of snapshot and other back files for IHS 200, hardware systems of an 200 IHS and/or software operating on an IHS 200, including operating systems and operating system applications, as well as virtualized software, such s virtual machines and virtualized storage systems. The backend system 325 may support multiple snapshot uploads in parallel from different RECs operating in the disaster recovery system 300.

The REC 315 support data backup and recovery efforts from one or more MECs 305 that may be distributed in a variety of manners with respect to IHS 200 that are being monitored. As illustrated in the embodiment of FIG. 4, multiple RECs 315 may be disbursed throughout the disaster recovery system 300. In some embodiments, one or more RECs 315 may be deployed by remote access controllers 255 of edge location IHSs 200, and may rely on the repository capabilities of backend system 325 for storage of snapshots, in light of the limited data storage of an IHS 200 that is available for use by a remote access controller. In some embodiments, RECs 315 may be implemented at a datacenter location that support one or more edge locations 320*a-d*. In some embodiments, RECs 315 may be deployed as plugins of the cloud-based repository of the backend system 325.

Configuration of each REC 315 may include registration with servers of a CDN network 310. In some embodiments, each REC 315 may be configured with logic for locating a CDN server 310 and with parameters for use in registration of the REC with the CDN network. Each REC 315 may rely on CDN servers 310 to locate repository 315 assets for periodically upload snapshots and other back data. REC 315 embodiments may each maintain secure connection with one or more MECs 305 via heartbeat signal. In some embodiments, a heartbeat signal is generated by each MEC 305 on a periodic basis and is monitored by one or more RECs 315. If the Heartbeat signal from a MEC stops, the REC may determine whether to initiate any failover procedures.

Upon a REC 315 detecting a heartbeat disconnection from an MEC 305, the REC 315 may initiate failover servers at a disaster recovery site that provides redundant capabilities to those monitored by the MEC 305 that is disconnected. Upon any re-connection of the MEC 305 such that the REC 315 is in receipt of heartbeat signals, the REC may send a signal to return the failover servers at the disaster recovery site to a standby state.

In some embodiments, the Monitoring Edge Clients 305 may deployed at the edge locations 320*a-d* that are being monitored in support of disaster recovery. In some embodiments, MECs 305 may be operating system applications of an IHS 200. In other embodiments, MECs 305 may be operated by a remote access controller 255 of an IHS 200, such as within a secure execution environment of the remote access controller. Configuration of each MEC 305 may include registration with CDN network servers 310. Once registered with CDN network servers 310, a MEC 305 may query the CDN network to in order to locate one or more RECs 315, and thus to direct snapshots and other backup data to a REC in support of the disaster recovery system 300.

Each MEC 305 may collect alerts and events from different hardware and systems, as defined based on a set of policies that may apply to an individual MEC and/or to all MECs in the disaster recovery system 300. In some embodiments, an MEC 305 that operates on an IHS 200, or otherwise is tasked with monitoring an IHS, may have an inventory of hardware systems operating on the IHS 200, such as an inventory provided in a factory-provisioned inventory certificate of the IHS. Based on this factory-provisioned inventory of hardware of an IHS 200, the MEC 305 may identify hardware systems of the IHS and may collect snapshots of these hardware systems, as well as snapshots of virtual machines operating on the IHS, as well as snapshot of other virtualized systems operating at least in part on the IHS, such as of virtualized data storage networks. In some instances, the MEC 305 may forward collected snapshots directly to a REC 315 that is responsible for this particular MEC. In some instances, a MEC 305 may instead relay the collected snapshots to a CDN network 310 that determines the appropriate REC 315 for delivery of the snapshot.

In some embodiments, each REC 315 may be provided with an inventory of participating IHSs and other systems within a datacenter, and also an inventory of edge locations that are being supported by that datacenter. Using such inventory information, each REC 315 may receive collected snapshots and other backup data, where they may be stored for some time until they are uploaded to the repository 325. As with the MECs 305, RECs 315 may rely on the CDN network 310 for locating the repository 325 and for delivery of data for uploading to the repository.

In some embodiments, each MEC 305 may include a local database for storing status information for each of the hardware, services and applications that are monitored by the MEC. In some embodiments, each MEC 305 may maintain a secure connection with one or more RECs 315 through the use of heartbeat notifications. In scenarios where there is complete disaster or other failure that results in a failure of the MEC 305 or an inability of the MEC 305 to generate network outputs, the heartbeat signal by the MEC will no longer be received by the REC 315 that is responsible for this MEC. As a result, the REC may issue a signal triggering disaster recovery operations to be initiated at a failover site. Once failover operations have been initiated, some REC 315 embodiments may identify and provide snapshots for use by the failover site in recovery operations. Using the snapshots provided by the REC 315, operations at the failover site may resume using the latest state information captured by one or more MECs 305.

In scenarios where there is only a partial failure where the MEC 305 remains operational and is able to provide network outputs to a REC 315, the MEC 305 may be configured to provide information relating to the affected service and applications. As illustrated at edge location 320*a* of FIG. 3, a MEC 305 may operate external to an IHS 200 and may thus operate regardless of whether the IHS is operational. For instance, an MEC 305 may operate on a processing component of a chassis 100, such as a chassis management controller or a designated sled that is dedicated to management of a chassis and/or rack. In some embodiments, a MEC 305 may operate on an IHS of an edge location, such as a designated management IHS, and may be used in monitoring and collecting state information for one or more other IHSs at the edge location.

Accordingly, as illustrated at edge location 320*d*, a single MEC 305 monitor and collect state information for multiple IHSs 200, such as for multiple compute and/or storage sleds 105*a-n*, 115*a-n* installed in a chassis 100. In such deployments, the MEC provides a reliable indicator of the operational status of an IHS and also provides system-wide visibility of IHS 200 state information that may be captured in a snapshot. Moreover, in the configuration of edge location 320*d*, a single MEC 305 may identify cascading failures that span multiple IHSs, thus providing additional information for use in determining the correct scope for failover operations.

However, as illustrated at edge location 320*b* of FIG. 3, a IHS 200 may include an MEC 305, such as a process of the operating system of the IHS 200 or of the remote access controller 255 of the IHS. In such configurations, the MEC 305 may have access to more detailed information relating to the state of specific applications and services operating on the IHS. In such configurations, a MEC 305 may provide more detailed indications of failures, where such indications may specify a failure in a specific application. In response to detecting a specific failure, while remaining operational, the MEC 305 may provide the REC 315 with information for use in identifying a snapshot for use in resuming the specific application at a failover site. MEC 305 embodiments may provide information identifying the failed application and any information relating to the last known state of the failed application.

As indicated at edge location 320*c*, an IHS 200 may include multiple MECs 305. In some such instances, distinct MECs 305 may be utilized within the operating system, hypervisor or any other environment operating on the IHS 200. In some embodiments, a hypervisor may operate an MEC 305 in preserving the state of virtual machines or environments in operation on the IHS. Through such state information, collected by an MEC 305, failover operations for the hypervisor may be provided through embodiments. In this same manner, virtualized systems in operation on the IHS, such as storage defined systems and computing clusters may similarly preserve state information for use in disaster recovery through hosting an MEC 305, such as part of management or other administrative operations of the virtualized system.

In some embodiments, each processor core of an IHS 200 may host an MEC 305 for use in capturing state information for applications operating on the processor core. In some embodiments, separate MECs 305 may be hosted by the system processor of an IHS 200 an by a remote access controller 255 of the IHS. In such instances, MECs hosted by the system processor, whether by the operating system, hypervisor or other environment operating on the processor, provide in-band state information in the snapshots it reports to the REC 315 responsible for the IHS 200. Also in such instances, MECs hosted by the remote access controller 255 provide side-band state information in the snapshots it reports to the REC 315.

Through combined and separate evaluation of in-band and side-band snapshots collected through such configurations, embodiments provide disaster recovery that better identifies failures that trigger failover operations and that also provide improved state information in the snapshots that may be used in resuming operations at a failover site. While edge computing locations provides certain improvements, the limited scope of hardware at an edge location may leave such locations more susceptible to failures that result in downtime, thus necessitating the need to initiate failover procedures.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A disaster recovery system comprising:
a first Information Handling System (IHS) at an edge location, the first IHS comprising:
one or more processors;
one or more memory devices coupled to the one or more processors, the one or more memory devices configured with stored computer-readable instructions that, upon execution by the one or more processors, cause a first monitoring client configured to be operated by a hypervisor to:
collect snapshots of an application comprising a virtual environment configured to operate on the first IHS;
transmit the snapshots to a recovery client configured to operate at a remote location; and
transmit periodic signals to the recovery client; and
a second IHS at a datacenter location, the second IHS comprising:
one or more processors;
one or more memory devices coupled to the one or more processors, the one or more memory devices configured with stored computer-readable instructions that, upon execution by the one or more processors, cause the recovery client to:
receive and store the snapshots of the application; and
initiate failover operations of the application based at least in part on the stored snapshots, upon failure to receive the periodic signals from the first monitoring client.

2. The system of claim 1, wherein the first monitoring client is further caused to: detect a failure on the first IHS and to send a notification to the recovery client of the failure.

3. The system of claim 2, wherein the notification comprises a signal for the recovery client to initiate failover operations for the application.

4. The system of claim 1, wherein the recovery client is further caused to: identify all monitoring clients in operation at the edge location upon failure to receive the periodic signals from the first monitoring client.

5. The system of claim 4, wherein the recovery client is further caused to direct all identified monitoring clients in operation at the edge location to capture available snapshots and to transmit the captured snapshots.

6. The system of claim 1, wherein the first IHS further comprises a remote access controller configured to operate a secure execution environment that hosts a second monitoring client configured to collect snapshots of the first IHS and to transmit the snapshots to the recovery client.

7. The system of claim 6, wherein the second monitoring client is configured to collect a sideband snapshot of the first IHS and wherein the first monitoring client is configured to collect an inband snapshot of the application.

8. The system of claim 1, wherein the recovery client is configured to initiate failover operations for the virtual environment based at least in part on the stored snapshots.

9. The system of claim 1, wherein the first monitoring client is further configured to be operated by an operating system of the first IHS and wherein the application comprises an operating system application.

10. A method for disaster recovery in a system comprising a plurality of Information Handling Systems (IHSs), the method comprising:
collecting, by a monitoring client operated by a hypervisor operating on a first IHS of the plurality of IHSs at an edge location, snapshots of an application comprising a virtual environment operating on the first IHS;
transmitting, by the monitoring client, the snapshots to a recovery client operating at a remote location on a second of the plurality of IHSs;
transmitting, by the monitoring client, periodic signals to the recovery client;
receiving and storing, by the recovery client, the snapshots of the application;
initiating, by the recovery client, failover operations of the application using the stored snapshots, upon failure to receive the periodic signals.

11. The method of claim 10, further comprising detecting, by the monitoring client, a failure on the first IHS and signaling the recovery client to initiate failover operations for the application.

12. The method of claim 10, wherein the recovery client initiates failover operations for the virtual environment using the stored snapshots.

13. The method of claim 10, wherein the monitoring client is operated by an operating system of the first IHS and wherein the application comprises an operating system application.

14. A first Information Handling System (IHS) comprising:
one or more processors;
one or more memory devices coupled to the one or more processors, the one or more memory devices configured with stored computer-readable instructions that, upon execution by the one or more processors, cause a monitoring client configured to be operated by a hypervisor to:
collect snapshots of an application comprising a virtual environment configured to operate on the first IHS;
transmit the snapshots to a recovery client configured to operate at a remote location, wherein the recovery client is configured to operate on a second IHS and receive and store the snapshots;
transmit periodic signals to the recovery client, wherein the recovery client is configured to initiate failover operations of the application based at least in part on the stored snapshots upon failure to receive the periodic signals.

15. The IHS of claim 14, wherein the monitoring client is further configured to detect a failure on the first IHS and signal the recovery client to initiate failover operations for the application.

16. The IHS of claim 14, wherein the recovery client is further configured to initiate failover operations for the virtual environment based at least in part on the stored snapshots.

17. The IHS of claim 14, wherein the monitoring client is configured to be operated by an operating system of the first IHS, and wherein the application further comprises an operating system application.

* * * * *